Oct. 5, 1948.  W. C. BUTTNER ET AL  2,450,825
CARBONATED WATER DISPENSER
Filed Jan. 17, 1944                                   3 Sheets-Sheet 1

INVENTORS
William C. Buttner
BY Harlow E. Allshouse
THEIR ATTORNEY

Oct. 5, 1948. W. C. BUTTNER ET AL 2,450,825
CARBONATED WATER DISPENSER
Filed Jan. 17, 1944 3 Sheets-Sheet 2

INVENTOR.
William C. Buttner,
BY Harlow E. Allshouse
Watson D. Harbaugh
THEIR ATTORNEY Oct. 5, 1948.  W. C. BUTTNER ET AL  2,450,825
CARBONATED WATER DISPENSER
Filed Jan. 17, 1944  3 Sheets-Sheet 3

INVENTOR.
William C. Buttner
BY Harlow E. Allshouse
THEIR ATTORNEY

Patented Oct. 5, 1948

2,450,825

UNITED STATES PATENT OFFICE 2,450,825

CARBONATED WATER DISPENSER

William C. Buttner, Winnetka, and Harlow E. Allshouse, Chicago, Ill., assignors to The Bastian-Blessing Co., Chicago, Ill., a corporation of Illinois Application January 17, 1944, Serial No. 518,528

1 Claim. (Cl. 261—115)

The present invention relates to refrigeration cabinets and more particularly to the carbonation of water under conditions conducive to the absorption of $CO_2$ without condensation of moisture in a liquid level control that might short cycle the operation of the water supply pump.

In carbonating water, it has been the usual practice to agitate water by a paddle in an atmosphere of high pressure $CO_2$ to accomplish a commingling which would accelerate absorption of the $CO_2$ into the water.

To drive the paddle involves many moving parts, and, aside from expensive packings on the paddle shaft, the device generates heat and entails too large a device for it to be placed in expensively maintained refrigerating space.

Moreover, in order to utilize a single prime mover for pumping the water against the $CO_2$ pressure head and for driving the paddle, the prime mover is generally mounted proximate to the container where, if the carbonator were to be refrigerated, the motor would be subjected to deleterious conditions such as condensation and possible frost incrustation.

In the present invention a new and improved arrangement is provided in which the carbonator is small, quite simple, and very rugged in construction with no moving parts involved, but which in combination with a refrigerated compartment utilizes the chill thereof to accelerate the absorption and the content of $CO_2$ in the water as well as affording a substantial reserve supply of cooled carbonated water as a standby for the rush hour mixing of refreshments.

Furthermore, the present invention includes an improved arrangement of parts by which short cyclings of operation are eliminated which heretofore occurred when condensation bridged the electrodes controlling the cycle of operation of the pump motor.

A further object of the invention resides in the prevention of $CO_2$ being blown back into the fresh water supply main if pump check valves happen to leak or be stuck in open position.

These being among the objects of the present invention, other and further objects will appear from the drawings, the description relating thereto and the appended claims:

Figure 1:
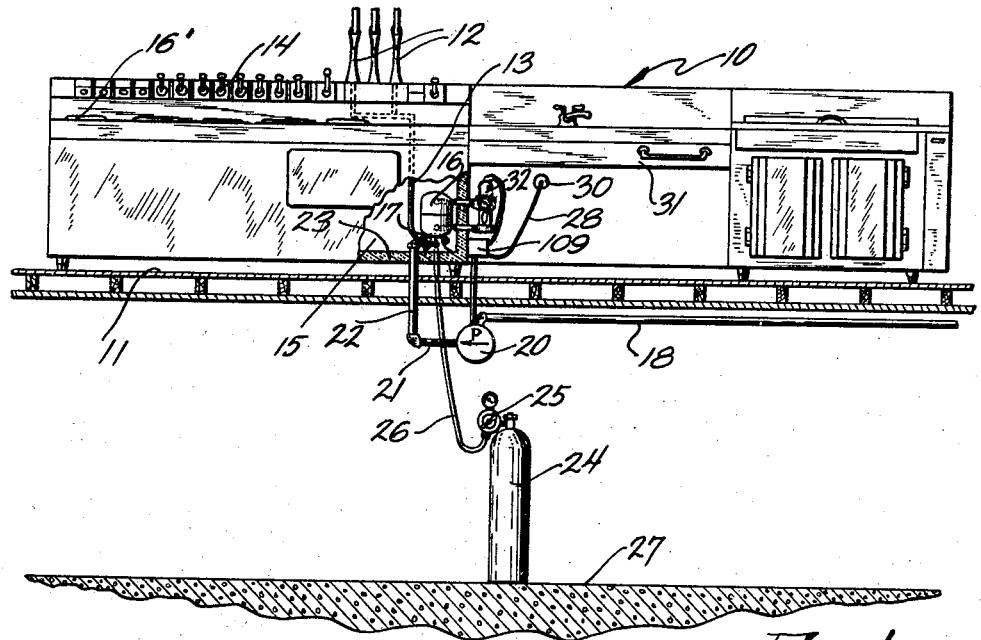
Fig. 1 is a side elevation of two floors of a soda fountain establishment, partially in section, showing how the invention is utilized with a soda fountain having an ice cream cooling cabinet.
Figure 5:
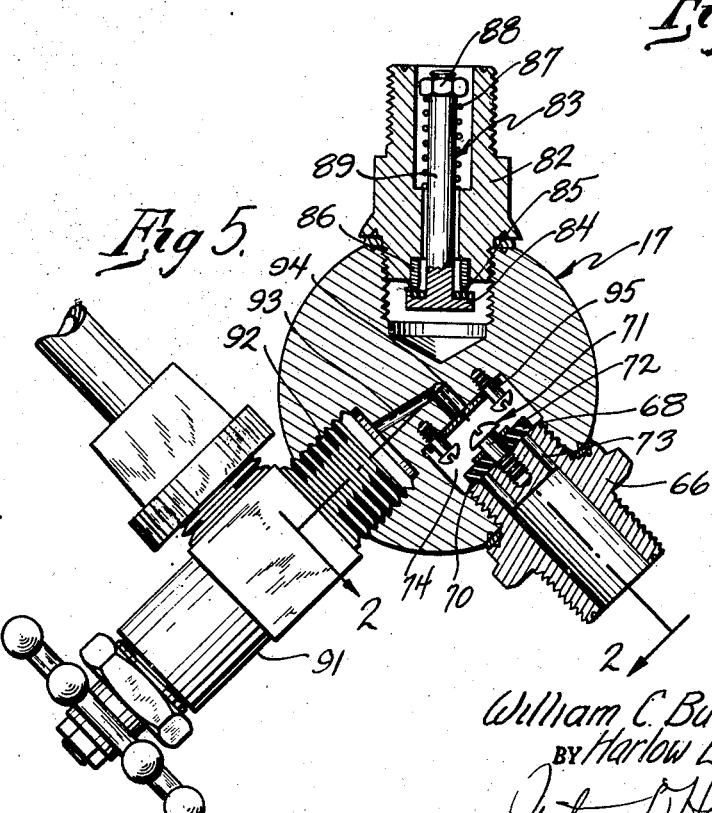
Fig. 5 is a section taken upon the line 5—5 in Fig. 2 with the section shown in Fig. 2 relating to same taken upon the angled line of 2—2 in Fig. 5.

Referring more particularly to the drawings, an ice cream cabinet 10 is shown in Fig. 1 where it rests upon the floor 11 and includes as a part thereof two carbonated water draft arms 12 supplied with carbonated water through a conduit 13. Jars for syrup used in mixing carbonated beverages are located at 14 in the jar rail below and in front of which are refrigerated compartments 15 for ice cream and other ingredients used in the beverages. The compartments 15 are accessible in part through doors 16'. In these refrigerating compartments the temperatures are kept at different levels. In the ice cream storing compartments the temperature is below the freezing point of water, while in a cooling cabinet where other ingredients are stored the temperature is within a range of 33° to 40° F.

Disposed in one of the cooling compartments, indicated at 15, a container 16, preferably of stainless steel is mounted upon a pedestal 17 and supplied with fresh water from a water main 18 as pumped by an electric motor driven pump 20 thorugh a pipe 22. The pipe 22 extends through the bottom wall 23 of the cabinet and is connected to the pedestal 17. Carbon dioxide ($CO_2$) is supplied to the container 16 from a tank 24 at a pressure reduced and controlled by a pressure regulator 25 whose outlet is connected to a conduit means 26 also connected preferably to the pedestal 17. The tank 24 is shown as disposed in the basement upon the cellar floor 27 where it is accessible without occupying much needed space upon the floor above.

The motor and pump 20 are powered through an extension cord 28 plugged into a conventional outlet receptacle 30 located under the drainboard and washtable 31 of the cabinet. The motor control itself comprises a gauge glass device 32 (Fig. 2) as more particularly disclosed in the Arndt Patent No. 2,303,716 and an application for Letters Patent filed November 11, 1940, by William C. Buttner, Serial No. 363,951, now Patent #2,356,119, dated August 15, 1944, reference to which is hereby made.

Figure 3:
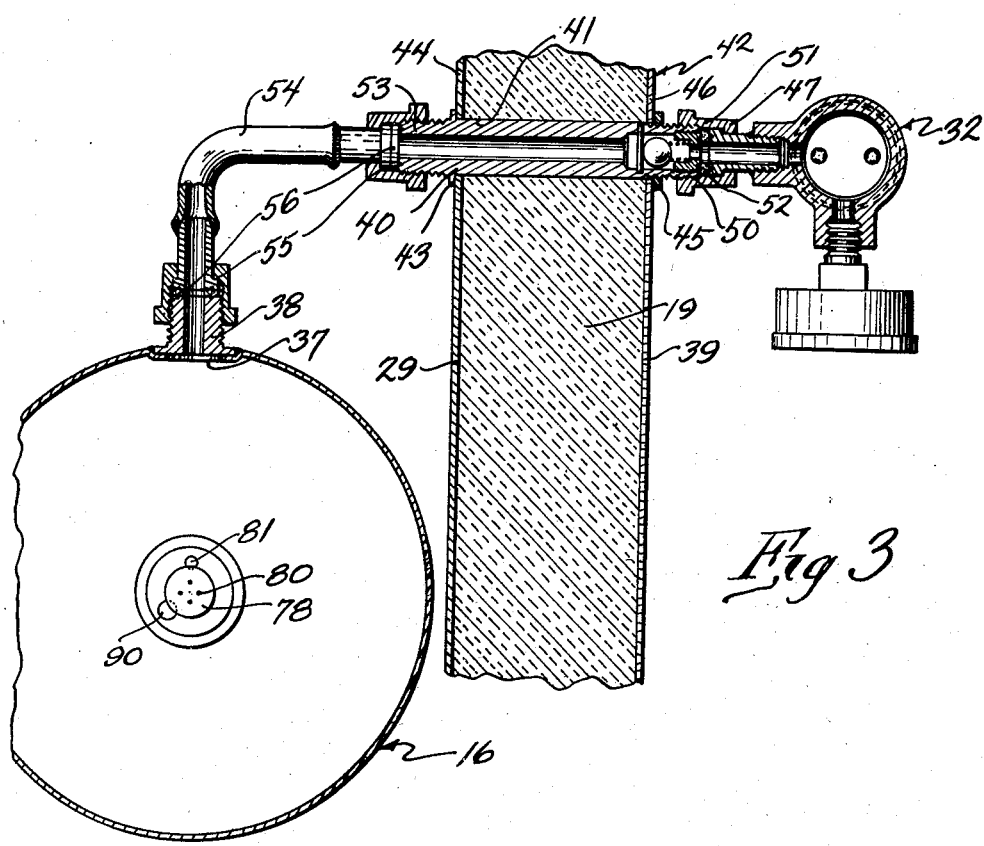
Fig. 3 is a section taken upon the line 3—3 in Fig. 2.

The container 16 constitutes a combination carbonator and carbonated water storage chamber made preferably of two shells 33 and 34 marginally flanged at their edges to meet and provide an external V groove 35 in which a weld 36 is made to join the shells in sealed relation. At the sides, as more particularly shown in Fig. 3 the shells are flattened and perforated as at 37 to receive in welded relationship threaded nipples 38 by which the container may be connected to the gauge glass 32. At the bottom the container is flanged and apertured as at 57 to provide an opening for mounting and affording access to the interior of the container as will be described in further detail later.

The connection to the gauge glass is accomplished through a nipple 40 received in an opening 41 in the wall 42 of the cabinet 10 where it extends through a thick layer of insulation 19. The nipple is flanged as at 43 to rest against the inner metal sheathing 29 of the cabinet wall 42 and a clamping nut 45 is threaded on the opposite end to rest against the outer sheathing 39 of the wall 42. Preferably on the outer end the passageway through the nipple 40 is enlarged to receive a normally open ball check valve assembly 47 which closes with an excess flow of fluid in the direction of the gauge glass 32.

Figure 2:
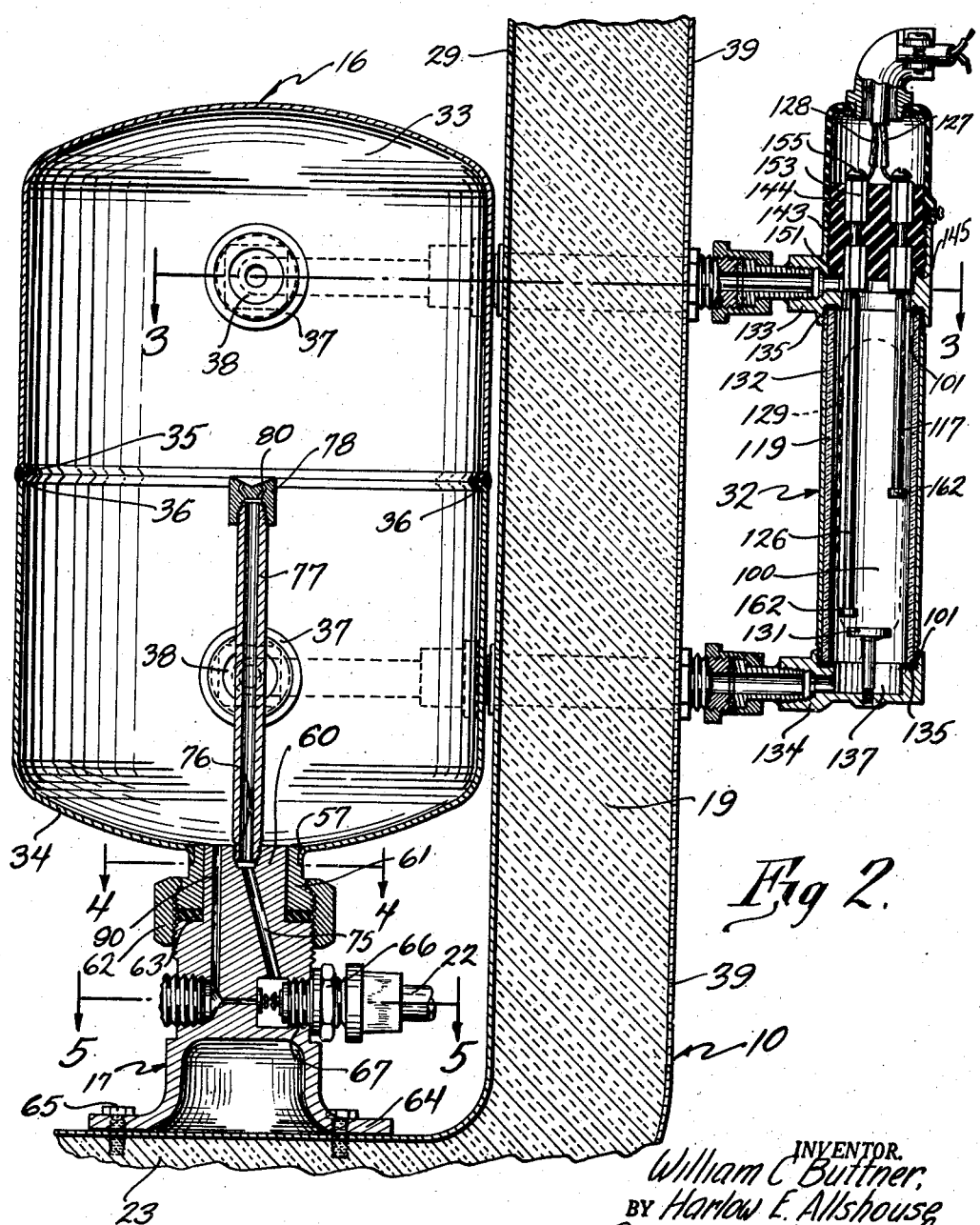
Fig. 2 is an enlarged vertical section of the carbonator shown in Fig. 1.

As will be seen in Fig. 2 the connection just described is duplicated at vertically spaced points, which points are determined as being above the maximum level and below the minimum level of the water in the container 16. The gauge glass 32 is secured to the threaded outer ends 50 of the nipples by means of union nuts 51 and washers 52. The inner threaded end 53 of the nipple 40 is secured to the nipple 38 by means of an elbow 54 and union nuts 55 at each end thereof with washers 56 provided for purposes of establishing leak-proof joints.

At the lower end of the container 16 the opening 57, already mentioned, receives male and female members 60 and 61, respectively, held together by a union nut 62 with a sealing washer 63 disposed therebetween.

It is preferred that the male member 60 be made of sufficient length and provided with flanges 64 at the bottom so that it may serve as the pedestal identified by the numeral 17, which pedestal is bolted to the bottom of the cabinet 15 by means of bolts 65 if desired although the bolts may be omitted if there is danger of condensation reaching the cabinet insulation through the bolt holes. Aside from the conduits which lead to the gauge glass 32 all communication with the interior of the container is had by passageways drilled through the male member 60. One of these passageways is the water inlet passageway 75 supplied from the conduit 22 secured to a nipple 66 that is threaded into the pedestal 17 as at 67. The nipple 66 is provided with a back flow check valve 68 at its inner end which comprises a washer 70 made of an elastomer and held in place by a screw 71 having a cylindrical shank portion 72 upon which the washer may slide to and from its seating position to close the passageways 73 drilled through the nipple 66.

Around the valve 68 the pedestal is cut away to provide an enlarged valve compartment 74 from which the passageway 75 leads upwardly to terminate in an enlarged threaded opening 76 at the upper end of the male member 60. A riser pipe 77 is received in the threaded opening 76 to extend upwardly at the center of the container 16 to receive a nozzle 78 thereon which is provided with spray passageways 80 to break up the water forced through them into a fine spray. The nozzle preferably directs the spray upwardly and against the walls of the container.

Figure 4:
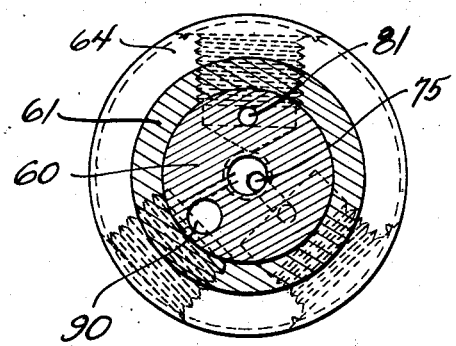
Fig. 4 is a section taken upon the line 4—4 in Fig. 2.

$CO_2$ is supplied to the container through another passageway 81 (Fig. 4) in the male member 60. This passageway leads upwardly and opens into the container at the upper end of the male member 60. The connection of the $CO_2$ line 26 to the pedestal 17 is had through a nipple 82 also provided with a back flow check valve 83 therein having a piston like head 84 which carries a resilient seat 85 against the rounded edge of a short piece of cylindrical tubing 86 brazed into the inner end of the nipple 82. The shank 89 of the valve 83 extends outwardly to receive a compression spring 87 that is held in place by a nut 88 threaded upon the shank 89. With this arrangement for the $CO_2$ supply, water will not be forced back into the line 26 in event the pressure in the container is higher than the pressure of the $CO_2$ or when one tank 24 is being disconnected to be replaced by a full tank of $CO_2$. Furthermore, the passageway 81 with its opening on the upper end of the male member 60 will release the $CO_2$ in the container 16 where it will bubble up through the water with a commingling beneficial to absorption to carbonate the water.

The carbonated water is withdrawn from the container through a passageway 90 drilled in the male member 60 and terminating at the upper end thereof, which point of termination is preferably the lowest point in the container. The carbonated water is taken to the draft arms 12 through the conduit 13 as controlled by a hand shutoff valve 91 threaded into the pedestal as at 92.

The carbonated water passageway 90 and the fresh water passageway 75 are in communication with each other through a passageway 93 which interconnects the valve compartment 74 and the opening into which the valve 91 is threaded. A flapper check valve 94 is located in the valve compartment 74 where it is held in place by screws 95 having cylindrical shanks so that the flapper check will operate easily and prevent the fresh water from going directly to the carbonated line when the pump 20 is in operation, but will permit the carbonated water to move from the container back into the fresh water line past the flapper check valve 94 in event a leak exists which permits a back flow of the water into the fresh water line 22.

As more particularly shown in the above mentioned copending application Buttner Serial No. 363,951, reference to which is made, the gauge glass 32 comprises the hydroelectrode control having two electrodes, one of which 117 is contacted by the liquid at the maximum level of the water in the container 16 and the other one, 126, breaks with the liquid at the lowest expected level of the water in the container 16. The upper electrode 117 is connected directly to an electrical control, such as that shown in the Warrick Patent No. 2,110,313, reference to which is hereby made, through the lead 127, and the lower electrode is connected by a lead 128 to a switch which short circuits the electrodes when the electrical control is in open position as far as the motor operation is concerned. The liquid 100 is grounded through an upwardly extending electrode 131.

The glass gauge 32 more specifically comprises an outer cylindrical metal housing 132 having a window aperture 129 therein and an inner glass tube 119 mounted between two end members 133 and 134 in sealed relationship therewith by resilient washers 135. The end members are internally threaded as at 101 and the cylindrical metal housing is threaded at its ends whereby a clamping pressure is exerted between the end members 133 and 134 against the ends of the glass tube 119 to compress the seals 135. The lower end member 134 is provided with a recess 137 which is connected to the container below the minimum expected level of the water therein by a union nut 51, as already described. The upper member 133 is threaded as at 143 to receive an insulating plug 144 against the shoulder 145. The plug 144 has a shoulder mating with the shoulder 145 with a gasket 151 disposed between them to provide a sealed joint.

The electrodes 117 and 126 are carried by the plug 144 and comprise inserts 153 which are threaded at opposite ends and embedded in the plug body. The upper ends of the inserts 153 receive the terminal screws 155 which secure the wire leads 127 and 128 to the respective electrodes and the other ends of the inserts 153 support interchangeable contacts to receive the electrodes 117 and 126 having carbon buttons 162 upon the bottom thereof.

In operation, when the electrical extension 128 is plugged into the outlet 30 the electrical control 109 is in closed position to operate the motor and pump 20. If the level of the water in the container is below and out of contact with the carbon button 162 upon the lower end of the electrode 126 the pump will immediately begin to withdraw water from the main 18 and force it into the container 16 through the riser pipe 77 and spray head 78.

With the $CO_2$ supplied to the container through the line 26 as regulated by the pressure regulator 25, the water sprayed from the head 78 comes into contact with $CO_2$ to absorb a large quantity thereof. After the level of the water has approached the level of the spray ports 80 the water comes in contact with the button 162 upon the lower end of the electrode 117 to actuate the control 109 to stop the pump.

After the carbonator has once been placed in operation the carbonated water present in the container 16 is chilled down to the temperature of the compartment 15 which preferably is within the temperature range of from 33° to 40° F. Thereafter, when carbonated water is withdrawn from the container 16 the level of the water falls until it breaks with the carbon button 162 upon the electrode 126 and the pump 20 repeats the cycle of filling the container 16 to its maximum level. The replenishing water may be pre-cooled in a separate cooler. On flowing through the pedestal 17 and riser pipe 77 it will be chilled by the coldness of the surrounding parts and the carbonated water surrounding the riser pipe 77 to a low temperature which is beneficial to the rapid absorption of the cold $CO_2$ gas present in the top of the container 16.

Furthermore, as the water level falls the $CO_2$ above it expands thereby reducing its pressure and permitting more $CO_2$ to enter the container to maintain the pressure determined by the regulator 25. Then, when the replenishing begins the liquid level rises which under other conditions would compress and increase the pressure of $CO_2$. The $CO_2$ is rapidly absorbed and more required, whereby the pressure in the container can be maintained uniform at all times by adjustment of the regulator 25, and the adjustment is sufficiently low to avoid an over carbonation at any time which is undesirable with root beer syrups.

The cold carbonated water moves back and forth into the gauge glass 32 as the liquid level rises and falls in the container 16. As the level rises cold water is carried into the gauge glass 32 to lower the temperature thereof by conduction and since the water thus introduced into the gauge glass is colder than its surrounding parts, condensation will take place upon the water itself. Otherwise, the upper end member 133 will take the temperature of the room to which it is exposed and the glass 119 will be sufficiently slow in conducting lowered temperatures that very little if any condensation will take place above the rising level of the water in the gauge glass. The lower member 134, however, will chill and condensation will take place on the outer portion thereof if there is any humidity present in the room air with which the gauge glass is in contact externally. In any event, since the gauge glass itself will be warmer than the water in it, and the room temperature will be warmer than the gauge glass, little if any condensation will take place inside of the gauge glass to form droplets which might bridge the electrodes and cause a short cycling of the motor control 109. The temperature differential relationship in the gauge glass will be conducive to a dryness of the inside wall of the gauge glass around the electrodes and at the top thereof since they are subjected to warmer temperatures.

Whenever, the pump 20 is shut down if there is any tendency to leak back through the water line 22, the leak is so controlled as to involve only carbonated water and not $CO_2$ gas. In understanding this, it will be noted that if the passageway 93 interconnecting the water line and the carbonated water line is absent, the pressure of the $CO_2$ at the nozzles 80 will be effective to force the water present in the riser pipe 77 down and back into the water line 22 with the gas escaping through the pump and into the washer main 18 to cause such undesirable results as carbonated water coming from some other faucet supplied by the water main 18. This danger is eliminated by the invention. The passageway 93 maintains a level of the water in the riser pipe 77 constant with that of the carbonated water in the container 16, or, approached another way, the entire body of liquid present in the container 16 must be forced out and into the water main through the passage 93 before discharge of $CO_2$ in its gaseous form will take place into the water main 18. However, before this occurs the lowering level of the carbonated water in the container 16 outside of the riser pipe 77 as well as inside the riser pipe will break contact with the carbon button 162 upon the electrode 126 and start the pump up again. Therefore, without any danger of $CO_2$ entering the water main 18 the pump recycles itself if there is any leak back through it, with the opportunity that during the recycling operation any valves that might stick will free themselves and close. The quantity of carbonated water involved in this instance is comparatively small and little, if any, $CO_2$ gas will be lost even though it may be prone to bubble while in the conduit 22. Suitable safe relief valves and gauges may be provided as desired.

In event it is necessary to service the gauge glass the union nuts 51 are removed with the check valves 47 closing to prevent escape of water or gas through the nipples 40. Thereafter, a new gauge glass can be substituted or the old one repaired and remounted merely by again tightening the union nuts 51. In event the carbonator is to be serviced the hand valve 91 is closed, the union nuts upon the gauge glass removed and also the clamp nuts 45, thereafter the nipples 40 are withdrawn from the opening 41 in the wall of the cabinet after the bolts 65 have been loosened and the conduits 13, 22 and 23 disconnected from the pedestal 17. Thereafter, once the carbonator is removed from the cabinet 15 the pressure supply in the container 16 can be released and the container drained by opening the valve 91. This arrangement makes it possible to remove the container 16 and the pedestal without spilling any water inside the cabinet. If the container is emptied, it can be removed by loosening merely the union nut 62 without disturbing the pedestal and connections. The union nut 62 can then be loosened and the male member 40 slipped downwardly to withdraw the riser pipe 77 and the spray head 78 thereon from the interior of the container. With the parts thus disassembled any repairs can be made which are required and the carbonator readily reassembled and restored to its normal position by reversing the process.

Having thus described the invention, it will be readily apparent to those skilled in the art that the device can be easily installed initially and various modifications can be made depending upon the size and shape of the cabinet and upon the requirements for making installations in cabinets of different sizes, without departing from the spirit of the invention, the scope of which is commensurate with the appended claim.

What is claimed is:

In a carbonated water dispensing device, a cabinet having a cooling chamber therein whose temperature is below 60° F., a container disposed in said chamber and connected to a source of $CO_2$ under pressure, a gauge glass connected to said container and disposed outside of said chamber; means for supplying the container with water under pressure including a pump, a water level responsive device disposed in said gauge glass, and a spray nozzle connected to the outlet of the pump, said nozzle being located in said container above the maximum water level in the container determined by said water level responsive device.

WILLIAM C. BUTTNER.
HARLOW E. ALLSHOUSE.

REFERENCES CITED

The following references are of record in the file of this patent:

UNITED STATES PATENTS

| Number | Name | Date |
|---|---|---|
| 1,332,945 | Holderle et al. | Mar. 9, 1920 |
| 1,373,075 | Humphrey | Mar. 29, 1921 |
| 1,437,306 | Hires | Nov. 28, 1922 |
| 1,447,884 | Philippi | Mar. 6, 1923 |
| 1,580,085 | Horn et al. | Apr. 6, 1926 |
| 1,611,321 | Schmidt | Dec. 21, 1926 |
| 2,103,479 | Magee | Dec. 28, 1937 |
| 2,117,271 | Bowman | May 17, 1938 |
| 2,217,841 | Holinger | Oct. 15, 1940 |
| 2,235,244 | Ames | Mar. 18, 1941 |
| 2,235,357 | Conklin | Mar. 18, 1941 |
| 2,317,484 | Richmond et al. | Apr. 27, 1943 |